United States Patent [19]

Simmons

[11] Patent Number: 5,178,579
[45] Date of Patent: Jan. 12, 1993

[54] POULTRY WASHER

[76] Inventor: Lacy Simmons, 101 Simmons Industrial Blvd., Dallas, Ga. 30132

[21] Appl. No.: 886,833

[22] Filed: May 22, 1992

Int. Cl.⁵ ........................... A22C 5/18
[52] U.S. Cl. ................................. 452/123; 452/173
[58] Field of Search .................... 452/173, 123, 116

[56] References Cited

U.S. PATENT DOCUMENTS

| | | | |
|---|---|---|---|
| 2,427,840 | 9/1947 | Davis | 452/116 |
| 4,557,016 | 12/1985 | Markert | 452/173 |
| 4,876,767 | 10/1989 | Harben, III et al. | 452/123 |
| 5,041,054 | 8/1991 | Van Den Nieuwelaan et al. | 452/123 |

Primary Examiner—Willis Little
Attorney, Agent, or Firm—Eric P. Schellin

[57] ABSTRACT

A washer for forcefully spraying with water the inside of eviscerated poultry that is traversing a treatment line. The washer is mounted on a module frame that moves with the line. The washer descends into the body cavity of the bird and sprays water thereinto. The washer is an elongated member having a rotatable hollow core with tangentially placed holes to thereby rotate the core as a result of water egressing therethrough. The core is surrounded by a cage. The washer is pivotally mounted and is detailed to arc upwardly with a bird that the washer is in.

13 Claims, 8 Drawing Sheets

POULTRY WASHER

BACKGROUND OF THE INVENTION

This invention is in the field of poultry processing apparatus and methods and is more specifically directed to a unique apparatus and method for effecting the removal of debris and other unwanted matter in the body of all types of poultry so as to avoid contamination externally of the poultry and, especially of the abdominal cavity and included is the concept of cleansing poultry externally under the aegis of powerful water sprays judiciously positioned.

The U.S. Department of Agriculture has issued regulations for poultry processing plants for the purpose of insuring the public health and welfare with these regulations being enforced by federal inspection on a continuous and regular basis. One substantial problem in the processing of poultry arises from the fact that the digestive tract organs are sometimes cut or otherwise opened during the eviscerating process so that the ingesta or feces contents are released in the abdominal cavity of the bird to completely contaminate the interior of the cavity.

My U.S. Pat. No. 4,739,539 was in response to the quest for a bird with a clean cavity and is incorporated herein by reference in its entirety. However, the present invention is an improvement nd operates in a different manner to achieve salutary results.

Prior to these inventions there was no satisfactory way for insuring that there would be no contamination in the event an undesirable tearing accident to the intestines resulting in contamination after such an accident. Any contaminated bird or parts thereof are immediately condemned for human consumption and is then normally converted into pet food or the like at substantial loss.

The present invention provides a washer system which enters the body cavity of a bird through an opening that has been previously cut to effect evisceration. The system includes a washer that is moved into the body. The washer is connected to a source of high pressure water which is turned on automatically when the washer is in the bird. The washer has a core means which rotates as the water is exited. A cage surrounding the washer ensures that there is a suitable separation from the core and the internal walls of the bird. Additionally, at the same time water sprays are positioned around the bird to cleanse the outside of the bird.

SUMMARY OF THE INVENTION

The present invention contemplates a pivotable washer that is mounted on a module that traverses synchronously for a distance with a poultry treating line. The washer is mounted so that it is reciprocably driven downwardly into the cavity of a bird through a previously cut opening. The washer is connected to water under pressure and automatically is turned on when the washer is in the bird and is essentially horizontal. When the washer is in the bird, it is pivoted upwardly whereby the wash water exits both out the mentioned previous opening and the neck opening carrying with it any and all contaminants.

The washer has a cage therearound to space a core thereof from the inside of the bird. Additionally, the core of the washer is detailed to rotate under the aegis of the water emanating therefrom and tangentially openings are provided therefor.

DETAILED DESCRIPTION OF THE INVENTION

Figure 1:
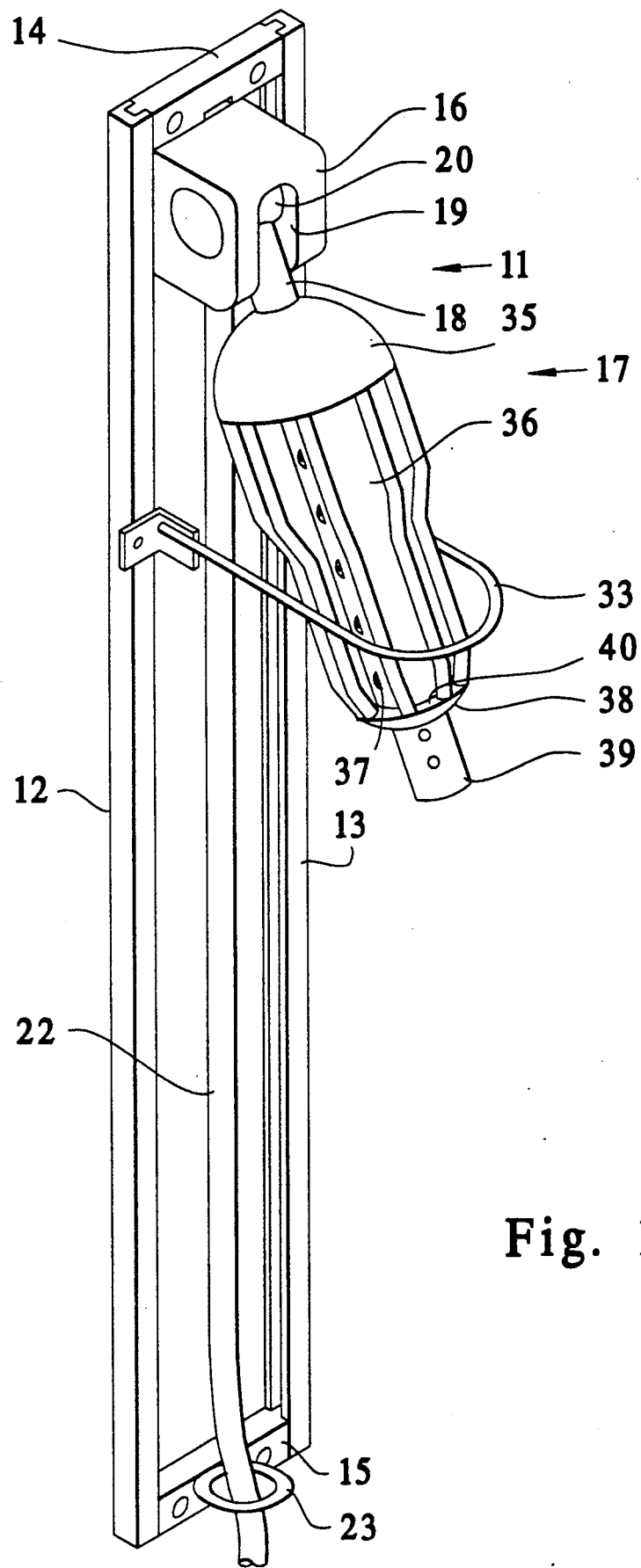
FIG. 1 is a perspective view of a module of the present invention carrying a washer.

Attention is now directed to FIG. 1 which depicts a module shown generally, as 11. The module consists of an elongated rectangularly shaped frame that is carried by endless means, not shown, in a carrier which moves the modules to a front position synchronously with defeathered previously treated upside down poultry carried by shackles on an endless chain.

The module 11 has two parallel rails 12 and 13. The module 11 is completed by upper piece 14 and a lower piece 15. A housing means 16 is reciprocatingly mounted on the said rails. The housing means pivotally carries the washer, generally, 17 of the present invention.

The proximal end 18 of the washer fits into a recess 19 and terminates in a ball valve 20 which is in the closed position when the washer is in the position as shown that is facing downwardly. The connection for water is completed at the underside of the housing means 16 to which is connected a flexible hose 22 which is suitably manifolded to a plenum for water.

The hose 22 passes through a ring 23 designed to keep the hoses of each module separate from each other.

Figure 2:
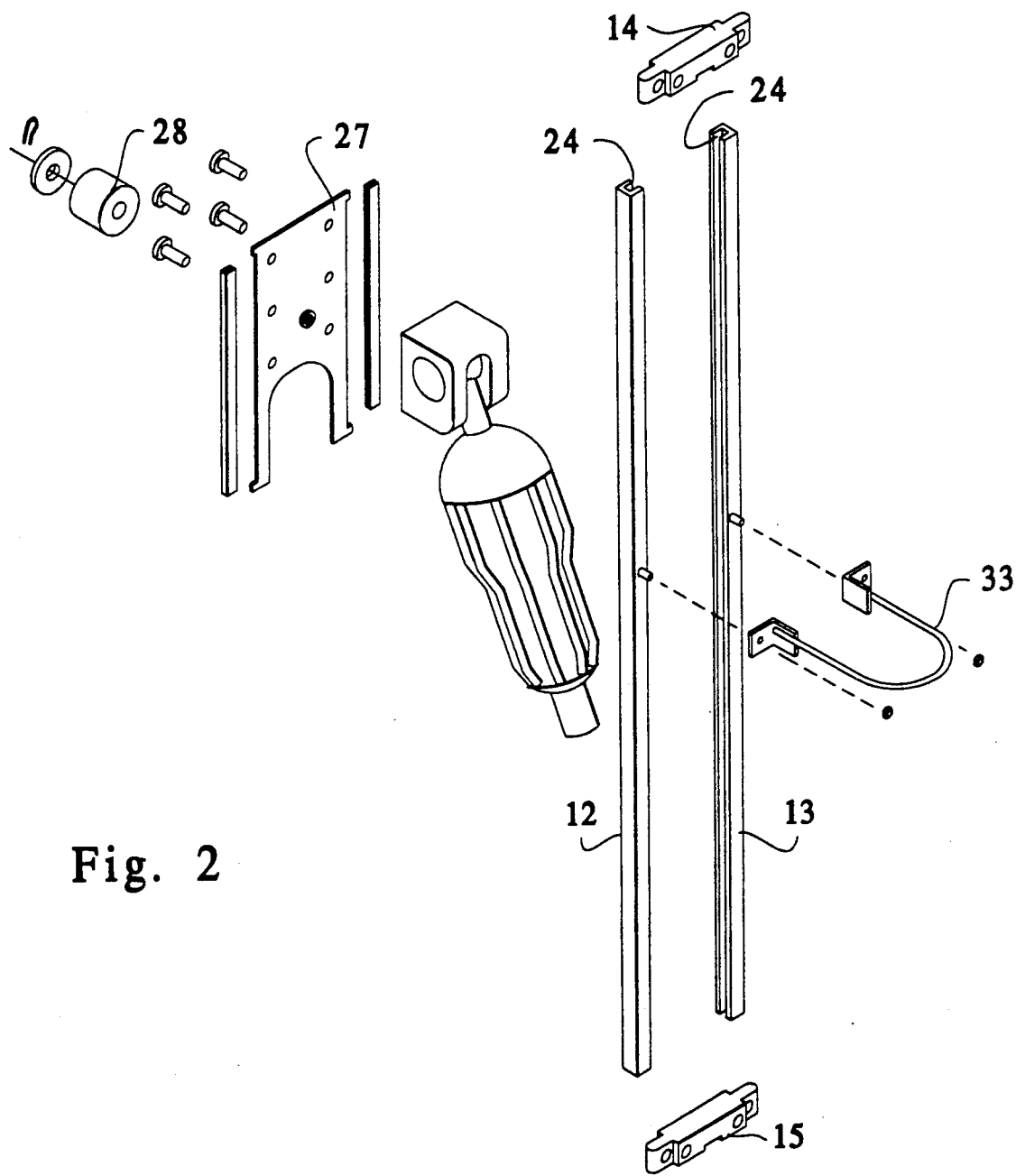
FIG. 2 is an exploded view of the washer and module to achieve greater clarity.

Attention is directed to FIG. 2 which shows the components discussed in regard to FIG. 1 in an exploded condition. Note that the reciprocatable housing means 16 include a base 27 which rides in the slots 24 of the rails 12 and 13. As stated the rails are connected by upper piece 14 at the top and by lower piece 15 at the button to complete a rectangle configuration.

Figure 3:
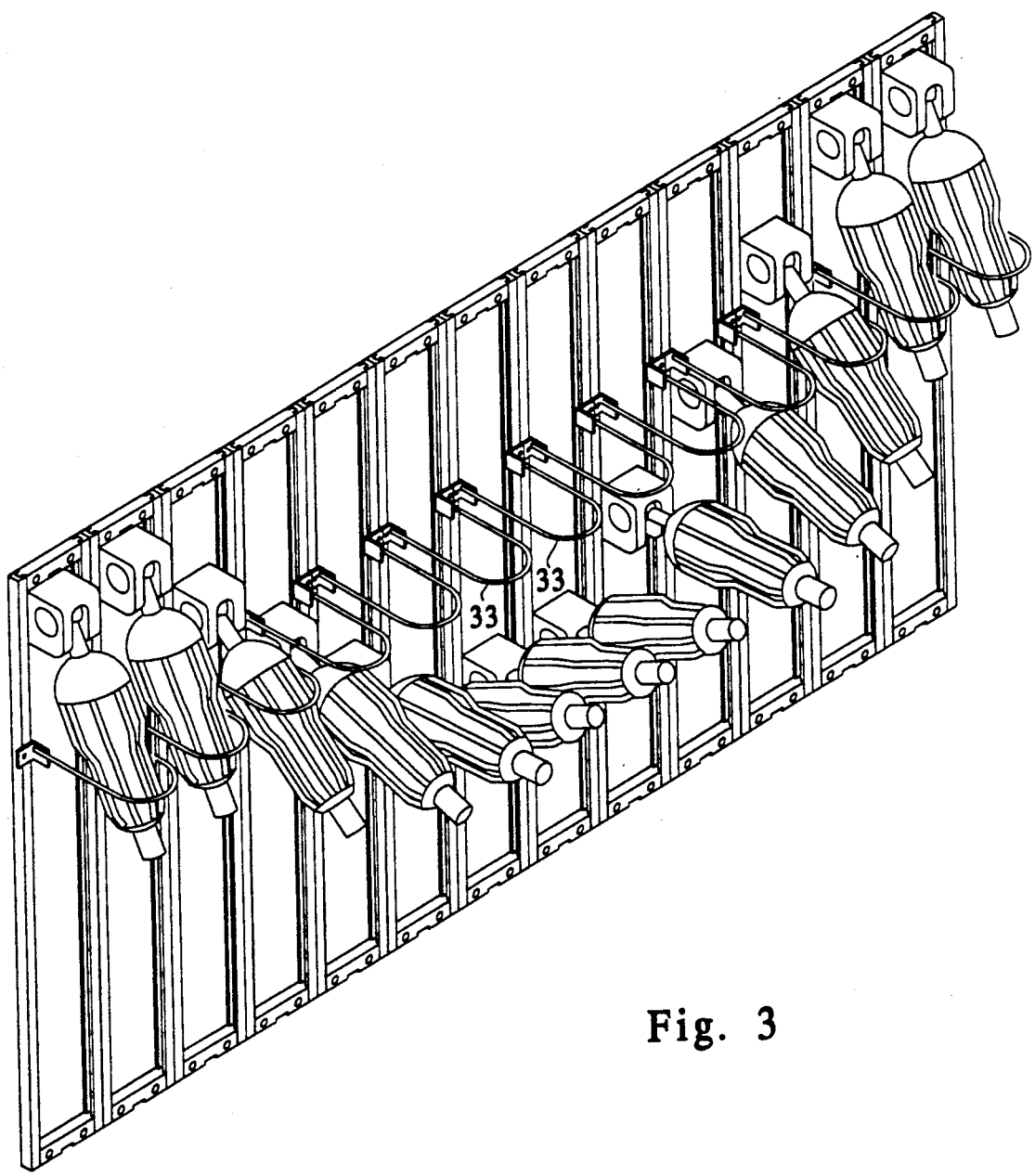
FIG. 3 is a perspective view of plurality of modules carrying the washer at various operable positions.
Figure 4:
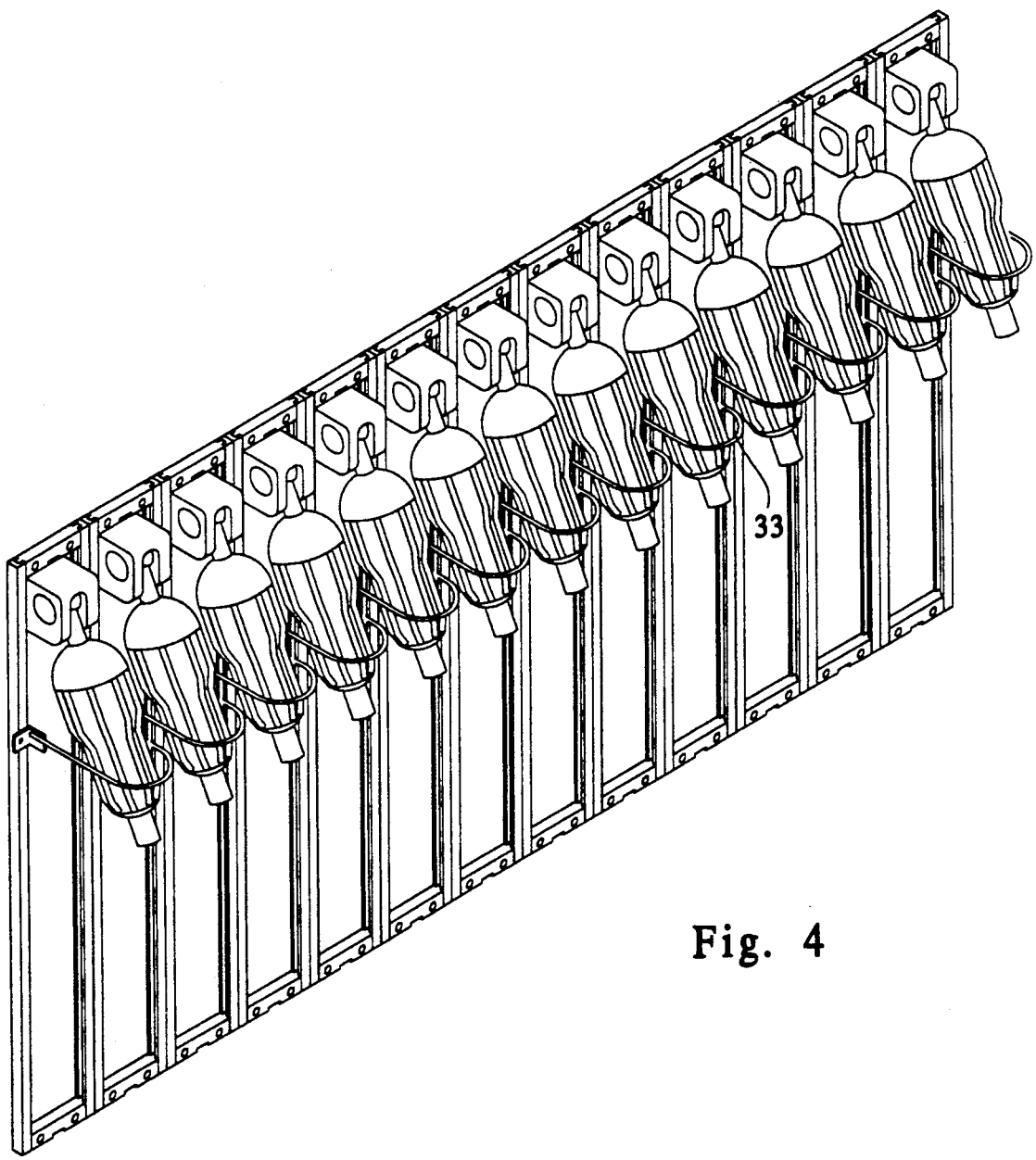
FIG. 4 is a perspective view of a plurality of modules carrying the washer as the modules traverse the backside of a carrier frame opposite to that of FIG. 3.
Figure 5:
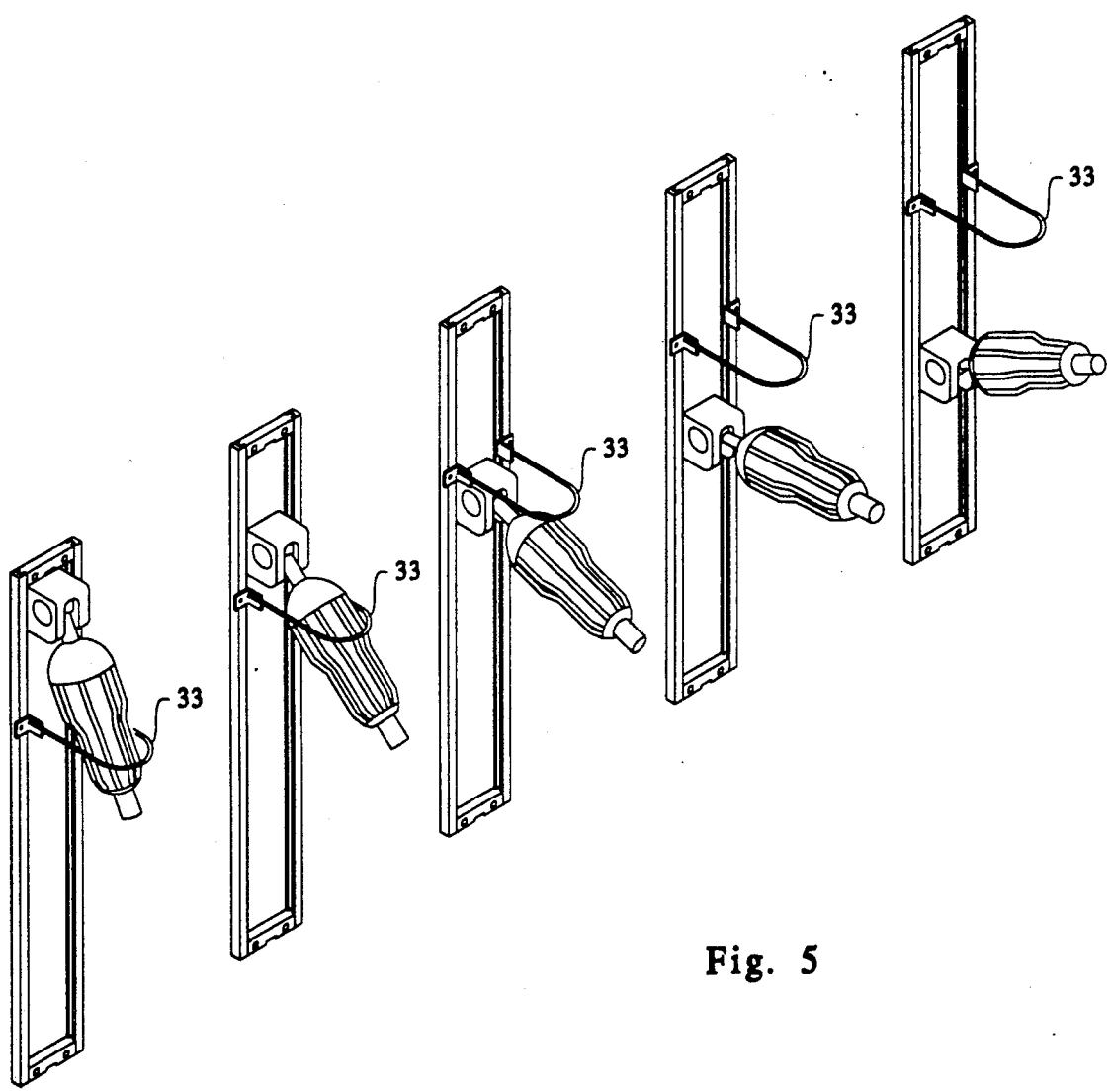
FIG. 5 is like FIG. 3 showing the modules and spray heads schematically in non-operating and operating condition all in spaced condition to enhance clarity and understanding.
Figure 6:
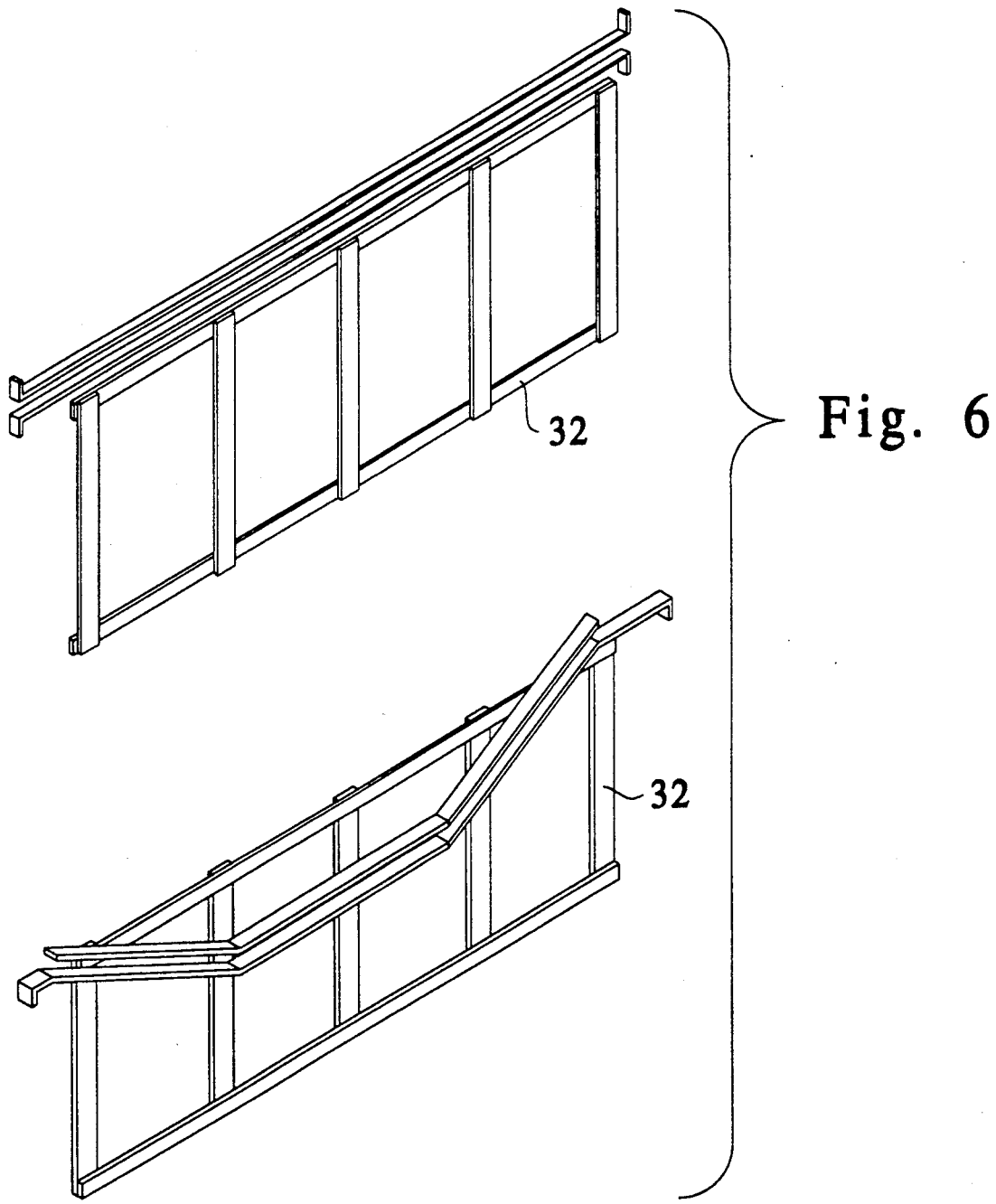
FIG. 6 is a perspective exploded partial view of the frame that carries the modules showing the downward and upward shapes of the cam surfaces at the front of the frame and the flat upper cam surface at the back of the frame.

At the back of base 27 is a horizontally journalled roller means 28 which rides on the cam surface 31 mounted on vertical frame 32 whereby the washer begins a descent as the module carrying the washer moves from left to right in FIG. 6. In the center of rendition of schematic FIG. 5 it will be seen to be below a U-shaped restraining ring 33. Such can also be seen in FIG. 3.

The washer 17 is an elongated member having a rounded base dome portion 35 that has a relatively flat portion in the direction of its distal end. A tubular cylindrical core 36 extends rotatably from the said flat portion. The said core is supplied with a series of spaced tangential holes 37. The core 36 is surrounded by a wire cage consisting of large diameter essentially equidistantly spaced rods extending downwardly substantially parallel and spaced with respect to the core 36. The cage is of a lesser diameter in the direction towards its distal end whereby to be accommodating with the interior of the cavity of the bird. Finally the spaced rods are suitably bent so that they meet fixedly at holding ring 38. The core's distal end 40 rotatably terminates axially in the ring 38. A fixed portion 39 extends beyond the ring 38. It has radial holes for water to spray therefrom.

When water is introduced into the washer a salutary thing occurs. Due to the said described tangentially positioned openings and the fact that the core is journalled with respect to base done portion 35, the core is rotated due to the jet action caused by the egress of the wash water from the said tangential openings.

Figure 9:
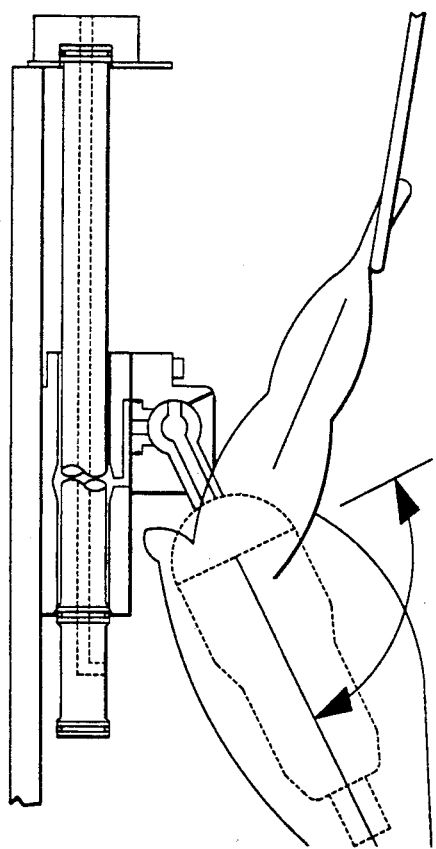
FIG. 9 is like FIG. 7 but showing the washer extrained in the cavity of a bird.
Figure 10:
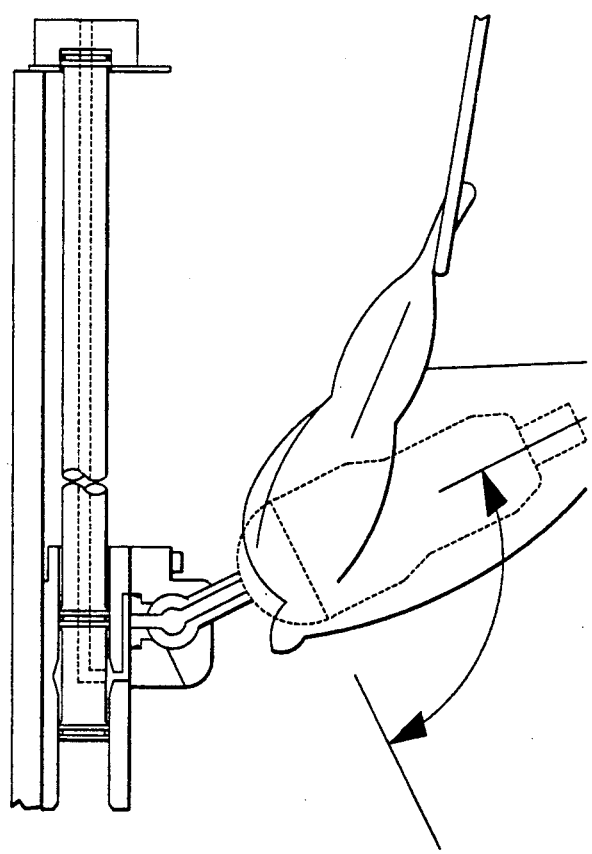
FIG. 10 is like FIG. 8 but showing the washer entrained in the cavity of a bird.

Furthermore because of a pivotal mount for the washer the washer will be arcuately raised by the poultry due to its ability to swivel about 90° about its hips as shown in FIGS. 9 and 10. As long as the washer is in the position shown by FIG. 1 or at the left portions of FIGS. 3 and 5 the washer will be contained by ring 33. As the cam action movement carries the washer to a position below the restraining ring the washer is freed and may pivot upwardly to assume a more horizontal position for the reason given in the above. As long as the washer is facing in a downward direction no or little water enters the washer, thereby not wasting water if no bird is present to enter thereinto.

In actual operation of the system the modules are movably attached to an endless drive means which circumscribes a path around a frame shown in FIG. 6. A conventional endless chain carrying swingable shackles each carries an upside down bird to a position synchronously opposite a washer module. Means is provided to thrust the bird against the module with its back in the direction of the module. As a module and bird move together in the same direction the cam surface 31 drives the washer downwardly into a previously cut opening at the upwardly facing body of an eviscerated bird. The bird is washed internally by the water emanating from the tangential openings of the core of the washer. Since the washer when in the bird is below the restraining ring 33 the bird swivels into a horizontal position carrying the washer into a position to open its respective water valve so water now exits from the said previously cut opening and from the neck opening as all obstructions in the bird have been removed by the body at various downstream locations.

In the embodiment shown in FIG. 1 the housing has a valve which is in a closed position when the washer is in the position shown in the figure. As the washer pivots upwardly the valve is upset to open to permit water to enter the washer and spray therefrom as indicated.

Figure 7:
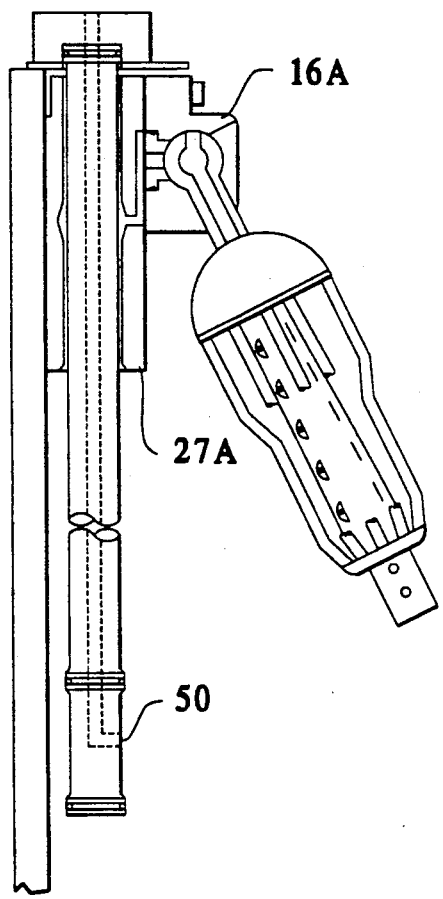
FIG. 7 is a partial side elevation of another embodiment of means for supplying water to the washer.
Figure 8:
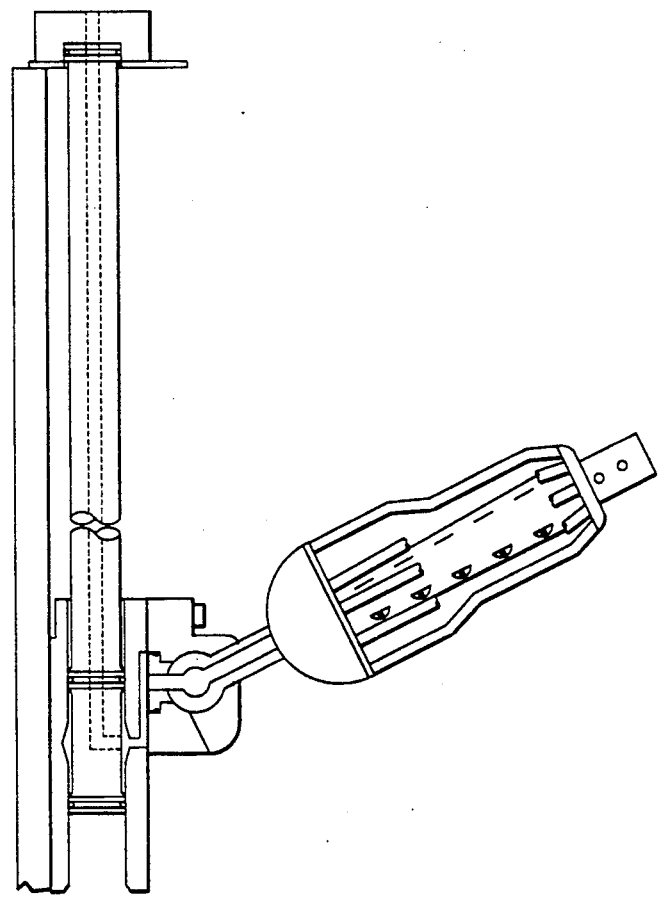
FIG. 8 is a partial side elevation of the said embodiment of FIG. 7 wherein the washer is in an operative position.

In an improvement as outlined in FIGS. 7 and 8, the plurality of hoses are eliminated. Instead the water is charged into an overhead plenum which is slidably operatively connected to a module as it moves into position. At the same time the base 27A carrying the housing 16A moves downwardly to a point opposite orifice 50 through which water egresses through conduit 51 when the module is in water receiving relationship with the plenum, not shown. Water gushes into the washer 17 and out of the numerous orifices thereof. It should be noted that the cage surrounding the core of the washer is shown broken away for greater clarity.

The subject invention should not be limited by the above described and illustrated embodiments, but rather should be limited solely by the claims that follow.

I claim:

1. A washer system for washing out the debris of the bodies of poultry comprising a module having a reciprocatable slide means thereon, said slide means having a valved housing means, a first conduit means for introducing water under pressure into said valved housing means, said housing means having a downwardly extending pivotably mounted second conduit means arcuately disposed with respect to said module, said second conduit operatively terminating with a washer means, said washer means having a tubular housing means, a journalled tubular cylindrical core extending axially from said tubular housing means, said core having a series of tangentially positioned openings whereby the core rotates in reaction response to water jetting from said core, the core being surrounded by a circular cage spaced from the core.

2. The washer system of claim 1 wherein the module has a restraining ring to restrain said washer from pivoting until said slide means is reciprocated to a position below the restraining ring.

3. The washer system of claim 1 wherein said first conduit means is a flexible hose.

4. The washer system of claim 1 wherein the first conduit means includes a plenum chamber from which water is supplied and said valved housing means contains a valve that is closed until the slide means is reciprocated to a point at lest below the restraining ring and is closed again when it is above said restraining ring.

5. The washer of claim 3 wherein said circular cage describes a multiple stepped configuration, the diameter of the first step of the cage is substantially the same as the tubular housing means and the cage incrementally decreases in diameter in the direction of the distal end of the core.

6. The washer of claim 5 wherein said tubular housing means describes a dome configuration opposite to the core.

7. A tubular washer for washing out the debris of a body of poultry comprising a tubular housing means at its proximal end, a rotatable tubular core extending distally from said housing means, said core having a series of circumferentially tangentially positioned openings thereby rotatable in reaction response to pressurized fluid emanating from said openings, the core being surrounded by a circular cage spaced from the core.

8. The tubular washer of claim 7 wherein said circular cage describes a multiple stepped configuration, the diameter of the first step of the cage is substantially the same as the tubular housing means and the cage incrementally decreases in diameter in the direction of the distal end.

9. The tubular washer of claim 8 wherein the distal end of the cage terminates in ring means and said core is journalled in said ring.

10. The tubular washer of claim 9 wherein the distal facing end of said ring has a tubular portion.

11. The method for vigorously washing out the debris from a body cavity of poultry comprising inserting vertically downwardly a tubular spray washer connected to a source of pressurized water into an opening of poultry supported in an upside down position by its legs, causing the body of the poultry to swivel upwardly arcuately about its thigh leg joints to a position whereby wash water being sprayed from said spray washer into the body cavity egresses from at least said opening and thereby carries any unwanted debris from the body cavity of said poultry.

12. The method of claim 11 wherein the poultry is sprayed externally with wash water when said spray washer is operating.

13. The method of claim 11 wherein comprises a tubular housing means at its proximal end, a rotatable core extending distally from said housing means, said core having a series of circumferentially tangentially positioned openings thereby rotatable in reaction response to pressurized fluid emanating from said openings, the core being surrounded by a circular cage spaced from the cage.

* * * * *